United States Patent [19]

Dinter et al.

[11] Patent Number: 5,542,534
[45] Date of Patent: Aug. 6, 1996

[54] PACKAGING SYSTEM FOR RECEIVING A FILM WEB WOUND UP IN ROLL FORM ONTO A WINDING SLEEVE

[75] Inventors: Peter Dinter, Hallgarten; Klaus J. Gleffe, Taunusstein, both of Germany

[73] Assignee: Hoechst Aktiengesellschaft, Frankfurt, Germany

[21] Appl. No.: 557,711

[22] Filed: Nov. 13, 1995

[30] Foreign Application Priority Data

Dec. 15, 1994 [DE] Germany ............... 44 44 749.3
Oct. 9, 1995 [DE] Germany ............... 195 37 547.5

[51] Int. Cl.$^6$ .................. B65D 21/02; B65D 85/672
[52] U.S. Cl. .................. 206/407; 206/416
[58] Field of Search .................. 206/413, 414, 206/415, 416, 397, 398, 407, 389; 220/378; 53/129.1

[56] References Cited

U.S. PATENT DOCUMENTS

| | | | |
|---|---|---|---|
| 3,352,410 | 11/1967 | Salladay | 206/52 |
| 4,884,690 | 12/1989 | Klenter et al. | 206/416 |
| 5,205,411 | 4/1993 | Born et al. | 206/416 X |
| 5,431,282 | 7/1995 | Kremp et al. | 206/416 X |

Primary Examiner—Jacob K. Ackun
Attorney, Agent, or Firm—Foley & Lardner

[57] ABSTRACT

A packaging system for a film roll containing, inter alia, a highly sensitive film web is disclosed. The system is made up of at least two end walls, with centrally arranged cylindrical plug-on protuberances or centering protuberances for receiving the winding sleeve which bears the film web, and are connected in a releasable, but sealing manner to the end walls via tensioning elements and sealing elements. The system further includes an inner winding sleeve and an outer protective sleeve, and thus, together with the end walls, sealing elements and tensioning elements, forms a closed packaging around the film roll.

19 Claims, 5 Drawing Sheets

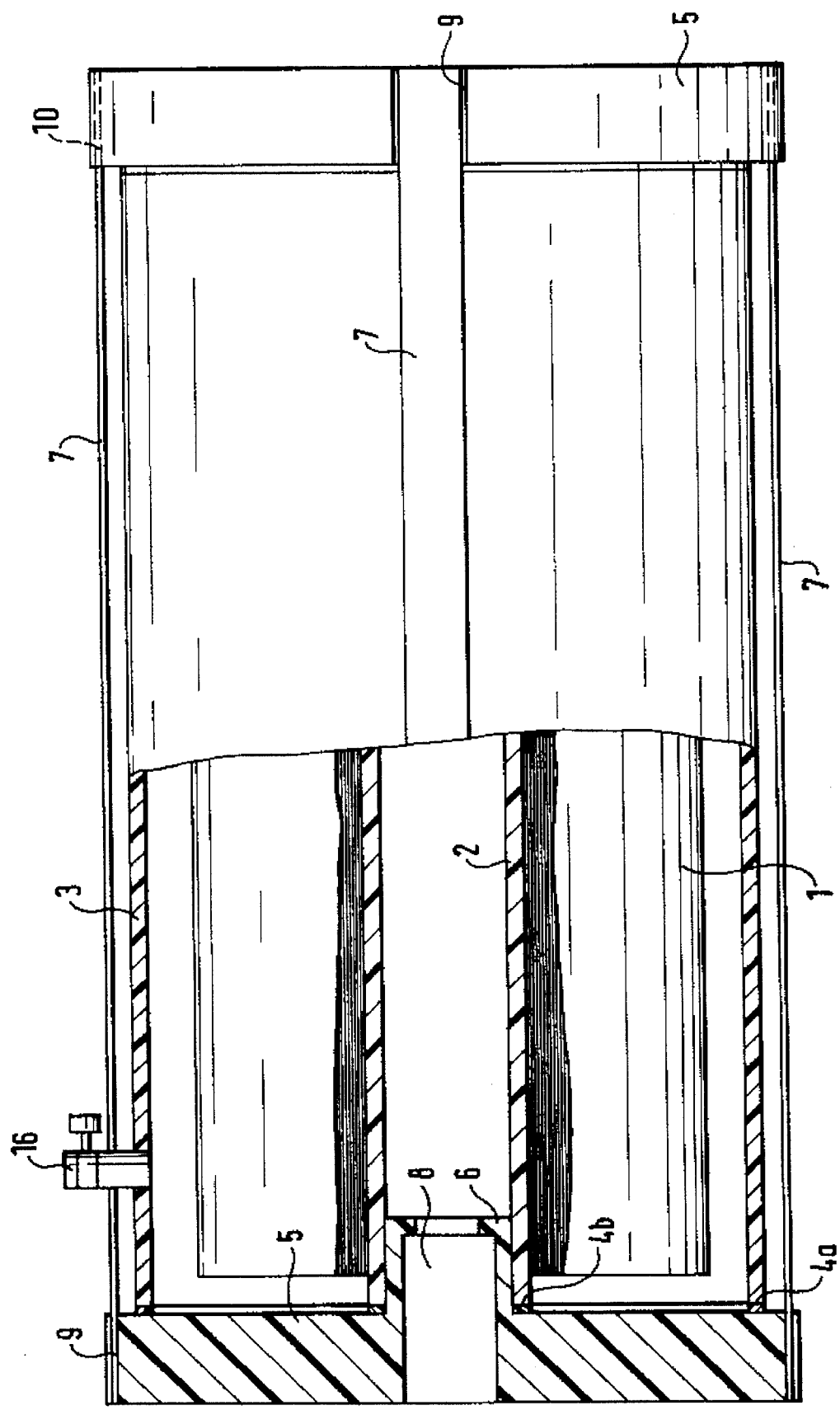

PACKAGING SYSTEM FOR RECEIVING A FILM WEB WOUND UP IN ROLL FORM ONTO A WINDING SLEEVE

BACKGROUND OF THE INVENTION

1. Field of the Invention

The invention relates to a packaging system for receiving a film web wound up in roll form onto a winding sleeve.

2. Description of Related Art

For a large number of industrial sectors today, it would be inconceivable to do without films made from a wide variety of polymer materials. These sectors include the electrical industry, where films, inter alia, in metallized form, are used to produce wound capacitors. The permanent miniaturization of the electronic components goes hand in hand with an inevitable reduction in the film thicknesses, which forces the manufacturers of the film virtually to the limit of what is technically possible. Consequently, at the moment, biaxially stretched ultrathin films made from polyethylene terephthalate (PET) in a thickness range of only 0.5 to 2 µm are commercially available. It is axiomatic that such thin films are extremely difficult to handle in subsequent further-processing steps.

In particular, this difficulty applies to the metallizing process which takes place in a high vacuum where the film is subjected to extreme thermal and mechanical loading. Here, two disruptive factors are present, namely, both (i) the air, which contains moisture to a greater or lesser degree and is enclosed between the individual film layers when the web is made; and (ii) the air moisture adsorbed by the film polymer itself. These disruptive factors, which are "brought into" the vacuum vessel directly with the film, adversely affect not only the progression of the process, but also the product quality to an intolerable extent. The aim of the improvements must therefore be to provide the processor with film rolls which are as free as possible of air and moisture. All the production measures for eliminating these disruptive factors are to no avail if it is not possible to safeguard the result with the aid of a suitable packaging system for selling to the customer.

DE-A 40 38 011 discloses a packaging for a film roll, having a winding core and two end pieces which are each pushed into the hollow winding core by their central protuberances, whereby a film web is wound up on the winding core to form a film roll. The disclosure of DE-A 40 38 011 is incorporated by reference herein in its entirety. The film roll is enclosed by a tensioned film tube which is connected to the end pieces, is shrunk at the ends into encircling grooves of the end pieces and thus is held in positively locking engagement with respect to the same. Disks which consist of an elastic material are arranged between the end surfaces of the film roll and the opposite surfaces of the end pieces and serve to seal the end surfaces and the cut edges of the film web and consequently prevent the escape of light-sensitive photoreactive polymer mixture, which, for example, coats the film web by cold flow. These disks also serve to prevent a situation where the photoreactive polymer mixture bonds the individual layers of the film rolled together. By virtue of the tensioning of the film tube, the disks are pressed onto the insides of the film roll and rest closely against the same in an elastic manner.

A sleeve is positioned around this arrangement whereby the sleeve comprises a rectangular blank of cardboard which is correspondingly bent and closed with a longitudinally running adhesive tape and fastened on the end pieces. The film tube serves as a tensioning element, which does not rest against the end pieces via a sealing element. The winding core is longer than the film tube, and its end edges are not sealed with respect to the end pieces by sealing elements. Disruptive factors cannot be prevented by the packagings which are presently used by the film manufacturers: these packings are described, for example, in patent specifications DE 38 08 064 and U.S. Pat. No. 3,352,410, the disclosures of which are incorporated by reference herein in their entirety. The solutions to the problems encountered in the aforementioned documents tend to rely on the use of film packagings, which are commercially available and, are principally in the form of bags, sacks, tubes, butt-ended bags, deep-drawn containers, etc. These commercially available films typically are used for the hygienic, flavor-maintaining and shelf-life-prolonging packaging of foodstuffs, and the solutions they provide, although practicable from a technical point of view, are not always ecologically viable.

SUMMARY OF THE INVENTION

An object of the invention therefore is to provide packaging which is suitable for the transportation and storage of highly sensitive plastic films in roll form. An additional object of the invention is to provide packaging that, on the one hand, ensures the desired protective function over a long period of time, i.e. hermetic encapsulation of the film roll with respect to harmful environmental influences, and, on the other hand, satisfies both ecological and economic requirements as a reusable system.

In accordance with these and other objects readily apparent to those skilled in the art, there is provided a packaging system for receiving a film web wound up in roll form onto a winding sleeve. The system includes at least two end walls which are spaced apart opposite one another and have central plug-on protuberances which fit tightly into the winding sleeve. The length of the winding sleeve predetermines the spacing between the to end walls, which are held together with the winding sleeve by tensioning elements. In the packaging system of the invention, a protective sleeve encloses a film roll on the winding sleeve, whereby the protective sleeve is of substantially the same length as the winding sleeve and the two sleeves project beyond the outsides of the film roll. In addition, sealing elements that can be made of an elastic material are arranged between (i) end edges of the protective sleeve and of the winding sleeve, and (ii) the opposite inner sides of the end walls.

In accordance with an additional embodiment of the invention, there is provided a method of packaging a film web wound up in roll form onto a winding sleeve which includes placing at least two end walls having central plug-on protuberances on opposite sides of the winding sleeve where the end walls fit tightly into the winding sleeve. The process then includes enclosing the film roll on the winding sleeve with a protective sleeve whereby the protective sleeve is of substantially the same length as the winding sleeve and whereby the two sleeves project beyond the outsides of the film roll. Sealing elements then are arranged between (i) end edges of the protective sleeve and of the winding sleeve and (ii) the opposite inner sides of the end walls. The end walls and winding sleeve, with its outer protective sleeve can be held togther using tensioning elements.

Those skilled in the art will appreciate that these and other objects of the invention can be achieved in accordance with the present invention, which is described in detail below.

BRIEF DESCRIPTION OF THE DRAWINGS

FIG. 1 illustrates a partial section of the construction of the packaging system according to the invention.

DETAILED DESCRIPTION OF PREFERRED EMBODIMENTS

Figure 3:
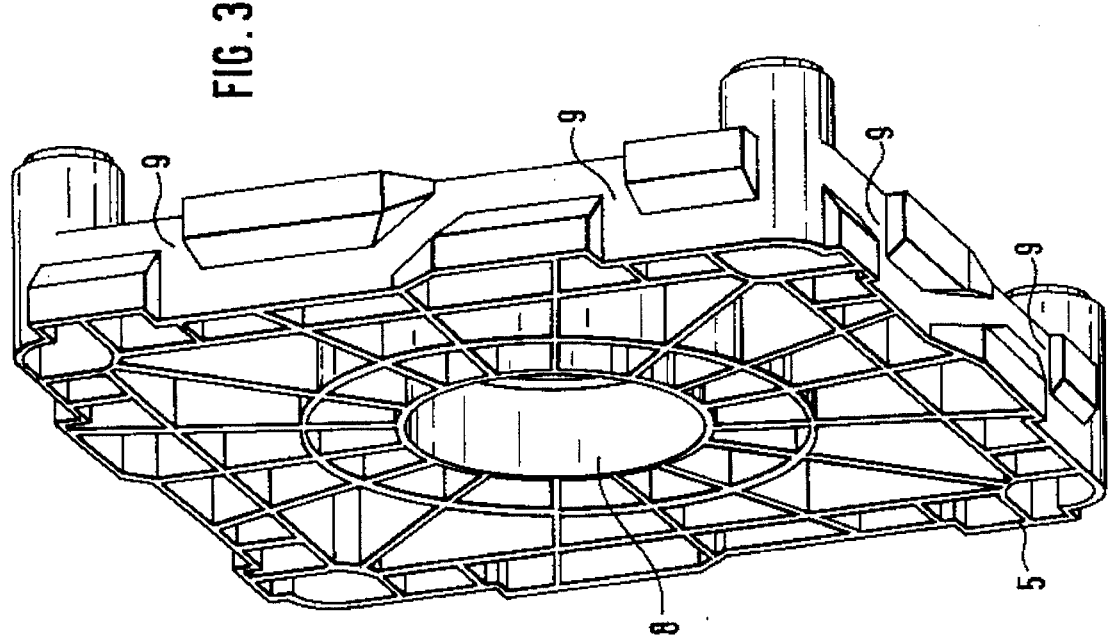
FIG. 3 illustrates a perspective view of the rear side of the end wall.

The present invention is directed to a packaging system suitable for the transportation and storage of sensitive plastic films. The system includes at least two end walls which are spaced apart opposite one another and have central plug-on protuberances which fit tightly into the winding sleeve. Preferably, the system includes two square or rectangular end walls. The length of the winding sleeve predetermines the spacing between the end walls, which can be held together with the winding sleeve by tensioning elements. A protective sleeve encloses the film roll on the winding sleeve and sealing elements are arranged between (i) end edges of the protective sleeve and of the winding sleeve, and (ii) the opposite inner sides of the end walls. Preferably, the protective sleeve is stable in its shape and serves to prevent the penetration of air and air moisture into the film roll.

In an embodiment of the invention, the elastic sealing elements are annular and their widths are equal to the wall thicknesses of the protective sleeve and of the winding sleeve. In accordance with an additional embodiment of the invention, there is provided a seal that is of a square, rectangular or circular form, the outer dimensions of the seal being at least equal to the outer dimension of the protective sleeve. A central opening of the seal has a diameter which is at least equal to the external diameter of the plug-on protuberance of the end wall.

In yet another embodiment of the invention, the outer dimensions of the seal are up to 20 mm greater than the outer dimension of the protective sleeve.

Referring to FIG. 1, there is shown a schematic partial section of a made-up film roll 1 which is packaged ready for dispatch and is wound up onto a cylindrical winding sleeve 2 made of, for example, a plastic material. The winding sleeve 2 can be made of other materials and the skilled artisan is capable of fabricating a winding sleeve 2 of materials other than plastic. A protective sleeve 3, which encloses the film roll 1, also can be made of plastic and is formed preferably as a cylinder. Protective sleeve 3 forms the outer protective casing of the packaging, and typically is substantially the same length as the winding sleeve and preferably is the same length. The protective sleeve 3 may also be of prismatic form, with a rectangular or square cross-section.

Elastic seals 4a, 4b, fitted between (i) end walls 5, 5 and (ii) protective sleeve 3 and winding sleeve 2, serve to seal the film roll 1. The end walls, 5, 5 preferably are in a square or rectangular form and have a central plug-on protuberance 6 which corresponds, in terms of its external diameter, to the internal diameter of the winding sleeve 2 and on which the winding sleeve 2 may be centered. Typically, two end walls 5, 5 are used, but the skilled artisan recognizes that more than two end walls may be used in accordance with the invention to provide an even larger packaging system, i.e., four end walls may be used.

Usually, the end walls 5, 5 along with the winding sleeve 2 and the protective sleeve 3, are held together in the axial direction, and pressed in a sealing manner, by tensioning elements 7. Tensioning elements 7, in the simplest case, can be straps made of steel or plastic, as are used as securing means for loading in the packaging sector. Those skilled in the art are familiar with the various securing means used for loading in the packaging sector including, but not limited to straps made of, inter alia, steel or plastic, all of which can be used in the present invention. In this arrangement, the tensioning straps 7 may be positioned as required, either through the hollow winding sleeve 2 and the central bore 8 of the plug-on protuberance 6 of the end walls 5, 5 and over the end edges 10 thereof, and/or as an exterior strapping over the end edges 10 of the end walls 5, 5. Guide grooves 9 made in the end edges 10 may serve to prevent the tensioning straps 7 from slipping and thus prevent the packaging from possibly becoming unsealed during handling and transportation.

Figure 2:
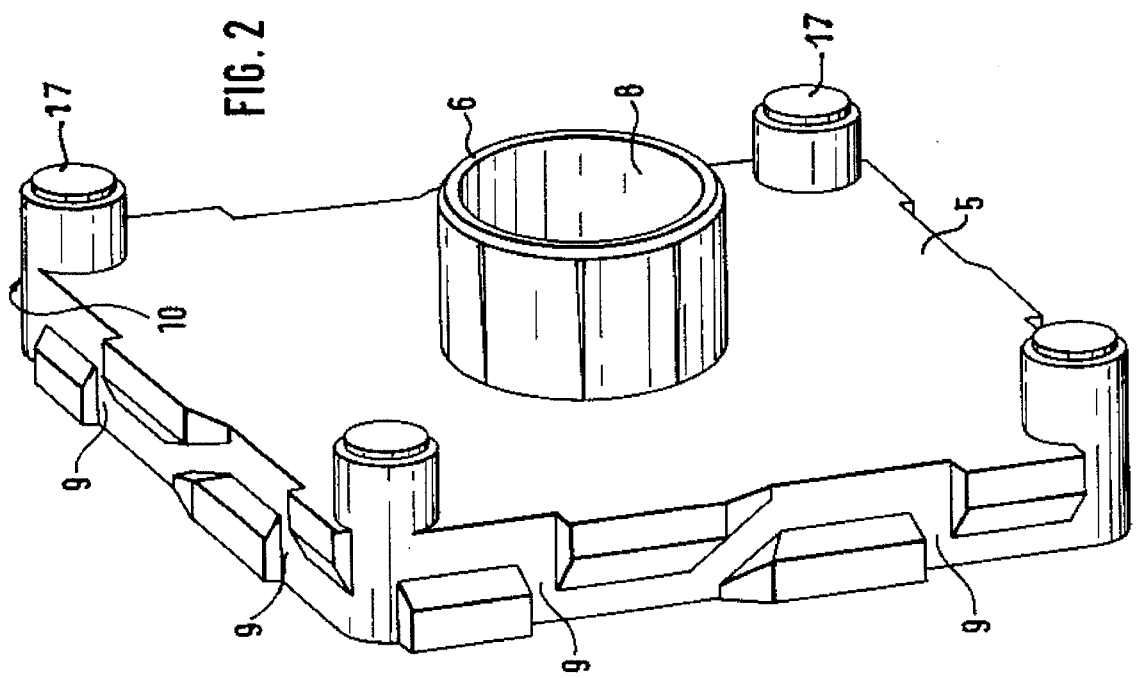
FIG. 2 illustrates a perspective representation of the front side of the end wall used for the packaging system.

Referring now to FIGS. 2 and 3, plastic end walls 5 are shown, which are described in detail in U.S. Pat. No. 4,884,690 (German patent specification 38 08 064), the disclosure of which is incorporated by reference herein in its entirety.

Figure 4:
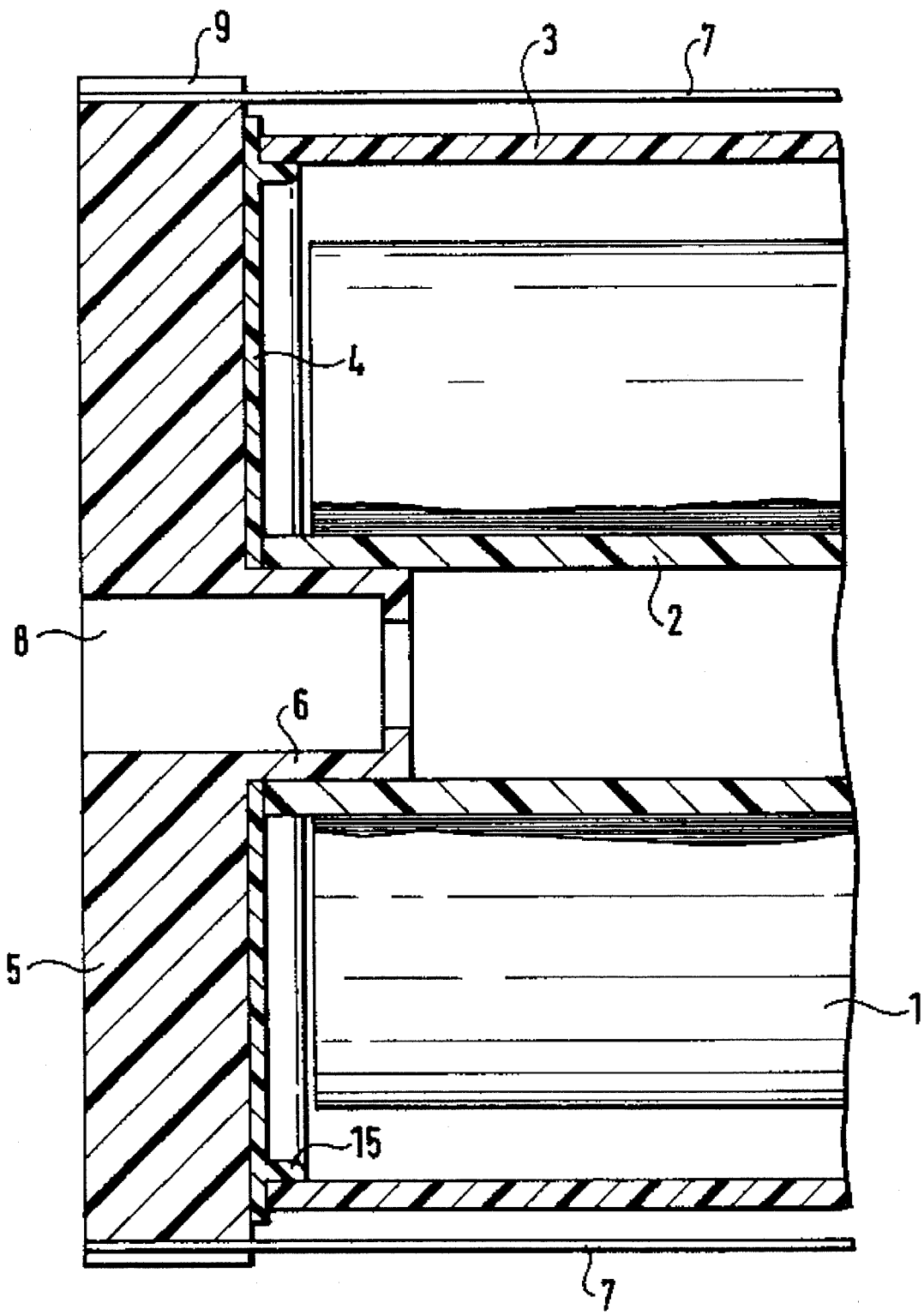
FIGS. 4 and 5 illustrate schematic representations of two embodiments of the packaging system with different seals between the end wall and the end edges of the winding sleeve and of the outer protective sleeve.

Referring now to FIG. 4, a variant of the seal between (i) the smooth front side of the end wall 5 and (ii) the end edges of the winding sleeve 2 and of the protective sleeve 3 is shown. In this embodiment, a seal 4 can include a piece of square or circular elastomeric material, for example, whereby the outer dimensions of the seal 4 correspond at least to the external diameter of the protective sleeve 3. Preferably, the outer dimensions of the seal 4 are greater than the external diameter of protective sleeve 3 by 20 mm. In addition, the diameter of a central opening of the seal 4 should correspond to the external diameter of the plug-on protuberance 6. For simpler concentric positioning of the protective sleeve 3, the seal 4 can be modified to the effect that it exhibits either a circular bead 15 (elevated lug) which is illustrated in FIG. 4 or a circular groove (not shown) which enters into engagement with the protective sleeve 3 to facilitate precise positioning of the protective sleeve 3.

An additional embodiment of the invention includes a mechanism for fixing the protective sleeve 3 absolutely securely in its concentric position with respect to the film roll 1. In this embodiment, correspondingly dimensioned spacer bushings can be used which are plugged onto cylindrical extensions 17, see FIG. 2, and which are arranged at the corners of the front side of the end wall and against which the protective sleeve 3 rests. Disks or cross elements, which can be plugged onto the winding sleeve 2, may likewise be used as centering aids for the protective sleeve 3.

Figure 5:
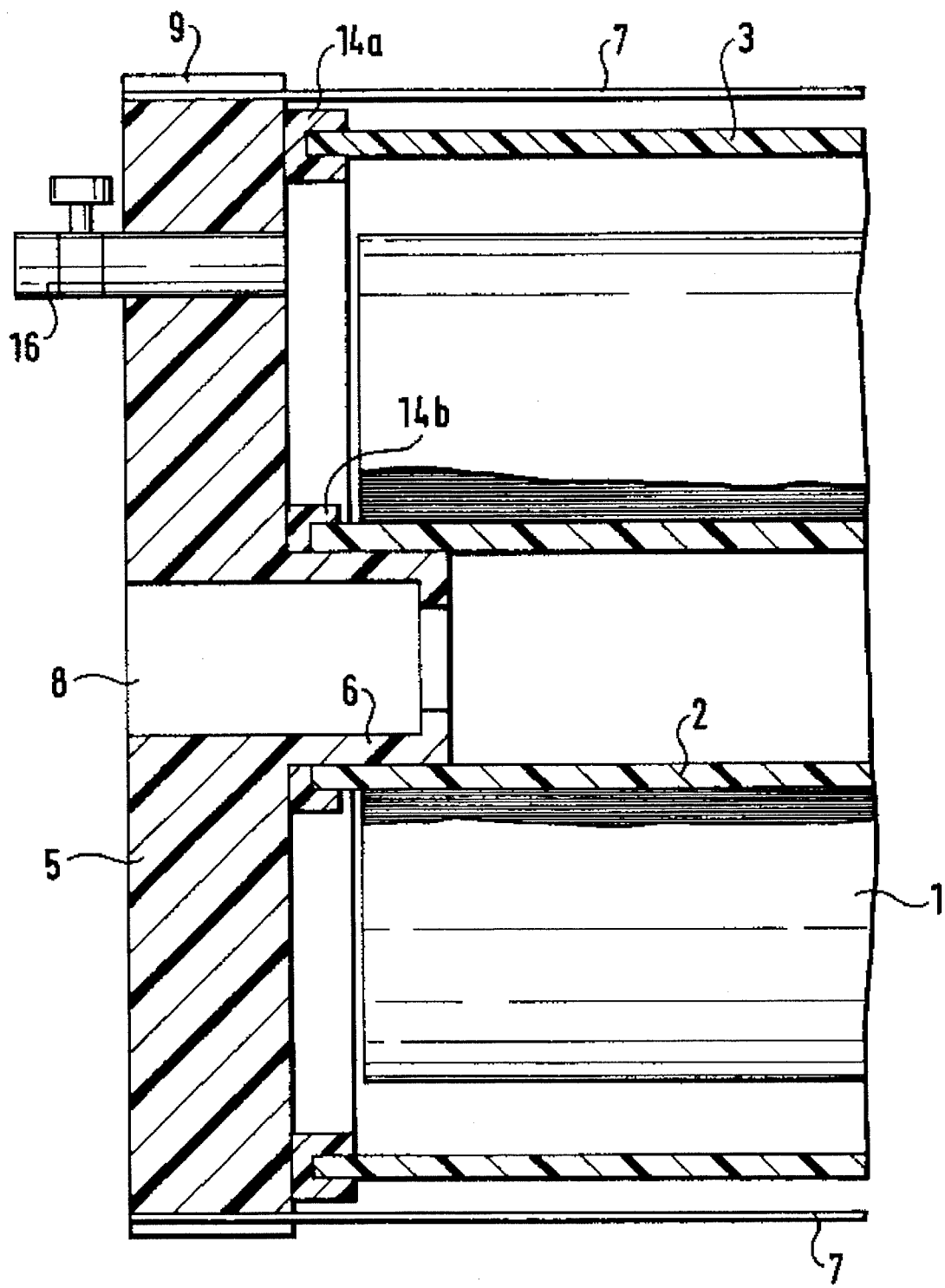

As shown in FIG. 5, the winding sleeve 2 and the protective sleeve 3 can be sealed by use of separate sealing elements 14a and 14b, respectively, which are matched to the respective diameters of the winding sleeve 2 and the protective sleeve 3. These sealing elements 14a and 14b are designed for the purpose of non-slip fixing as either a U-profile (14a) or as an angular profile (14b). Those skilled in the art will appreciate that the sealing elements which are represented in the aforementioned Figures and described above constitute only a small selection of the technical possibilities. The skilled artisan is capable of making further design variants on various sealing elements using the guidelines provided herein. Also shown in FIG. 1, 3, and 5 are the guide grooves 9 which are formed on outer side walls of end walls 5, 5, and which serve to accommodate the tensioning straps 7 when these elements are used to secure the protective sleeve 3.

Figure 6:
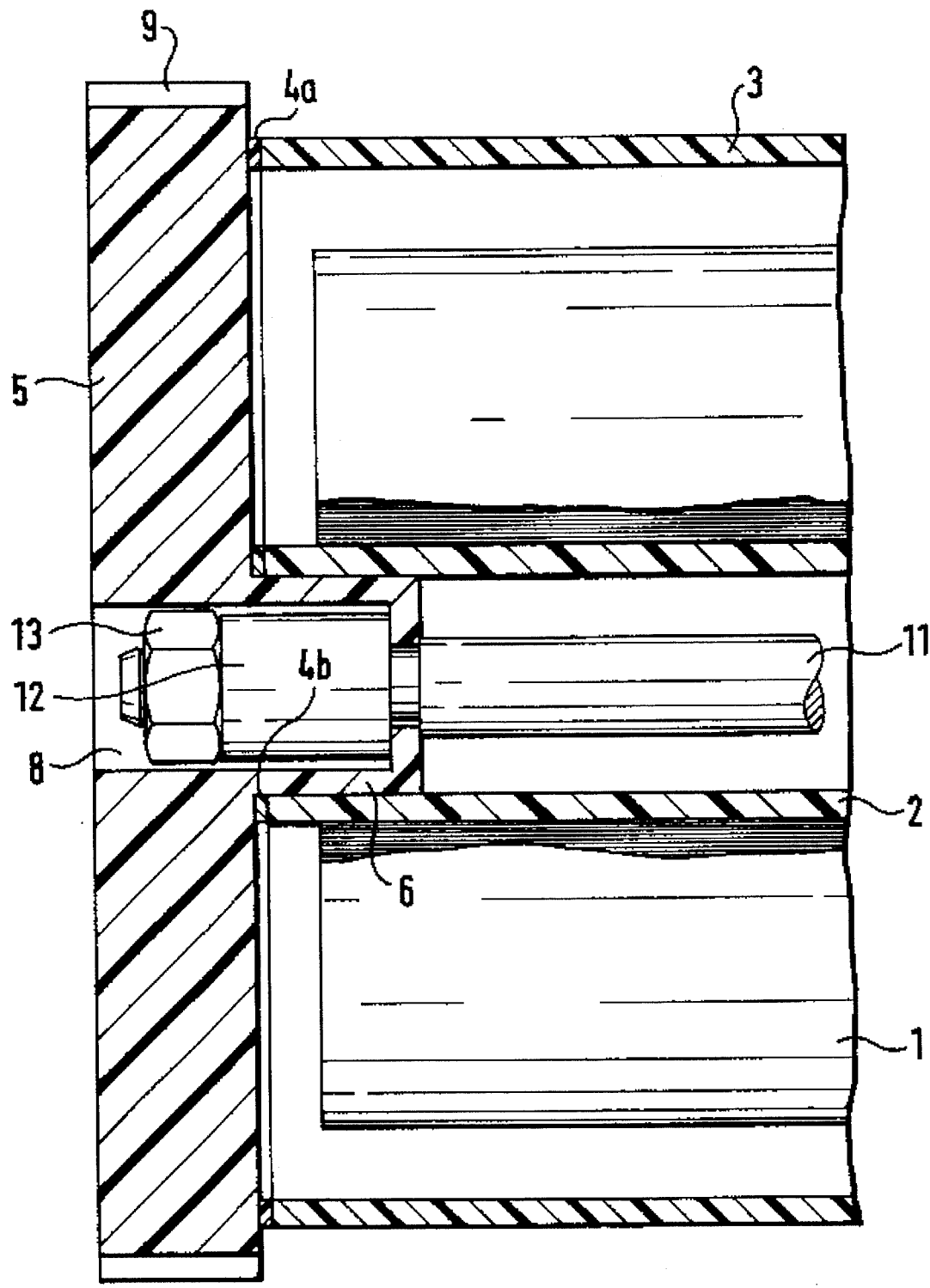
FIG. 6 illustrates a tensioning element for the sealed closure of the packaging system.

As shown in FIG. 6, securing for loading can be carried out not by tensioning elements 7, but by a threaded bar 11 with an associated spacer bushing 12 and threaded nut 13. This particular embodiment permits flush stacking of the packaging on transporting pallets since the tensioning elements are arranged completely in the central bore 8 of the end wall and of the winding sleeve 2. An advantage of these tensioning elements over the tensioning straps 7 is that they can be reused, as can the rest of the packaging according to the invention. Sealing of the film roll 1 can take place, similarly to the embodiment illustrated in FIG. 1, by elastic seals 4a and 4b between the end walls 5, 5 and the protective sleeve 3 of the winding sleeve 2.

The above-described packaging according to the invention, made up of lightweight plastic elements with a high mechanical strength, provides not only optimum transport protection for rolls of high-grade films, but also provides the possibility of adapting the external storage conditions for the film roll to requirements and also ensuring these conditions for a long period of time. If, for this purpose, the outer protective sleeve 3 or the end walls 5, 5 are provided with corresponding connection fittings 16 (see FIGS. 1 and 5), it is possible to establish in the interior of the packaging, conditions, e.g. positive pressure, negative pressure, air-moisture content, inert-gas atmosphere, etc., which differ from the external storage conditions. If the outer protective sleeve 3 is manufactured from transparent plastics, e.g. PVC, polycarbonate, PMMA or the like, then indicators fitted in the interior of the packaging can be monitored visually, and changes in the indicators may provide information on the current state prevailing in the packaging.

The above-described invention achieves the following advantages; protection of the packaged film roll against mechanical damage and harmful environmental influences; establishing specific storage conditions is possible; low packaging weight due to the use of highly resistant and, at the same time, lightweight plastic elements; low packaging costs due to the use of cost-effective elements and recyclability of the packaging as a reusable system; elements which are of a simple design and consist of sorted, recyclable materials; no disposal costs; and as a reusable system, the ecological requirements of the packaging directive are fully satisfied.

While the invention has been described by reference to particularly preferred embodiments thereof, those skilled in the art will appreciate that various modifications can be made to the invention without departing from the spirit and scope thereof.

What is claimed is:

1. A packaging system for receiving a film web woundup in roll form onto a winding sleeve, comprising:
    a film web wound up on a winding sleeve;
    tensioning elements;
    at least two end walls which are spaced apart opposite one another and have central plug-on protuberances which fit into said winding sleeve, the length of which predetermines the spacing between said at least two end walls, and which are held together with the winding sleeve by said tensioning elements;
    a protective sleeve which encloses said film roll on said winding sleeve, wherein the protective sleeve is substantially the same length as the winding sleeve and said protective sleeve and said winding sleeve project beyond end sides of said film roll; and
    sealing elements arranged between (i) end edges of said protective sleeve and of said winding sleeve and (ii) opposite inner sides of said at least two end walls.

2. The packaging system as claimed in claim 1, wherein said sealing elements are annular and their widths are equal to the wall thicknesses of (i) the protective sleeve and (ii) of the winding sleeve.

3. The packaging system as claimed in claim 1, wherein the shape of said sealing elements is selected from the group consisting of square, rectangular and circular, wherein the outer dimensions of said sealing elements are at least equal to the outer dimensions of the protective sleeve, and wherein a central opening of said sealing elements has a diameter which is at least equal to the external diameter of the plug-on protuberance of said at least two end walls.

4. The packaging system as claimed in claim 3, wherein the outer dimensions of the sealing elements are up to 20 mm greater than the outer dimension of the protective sleeve.

5. The packaging system as claimed in claim 1, wherein said sealing elements seal end edges of the protective sleeve, said sealing elements comprising a U-shaped profile and are dimensionally matched to the wall thickness of the protective sleeve.

6. The packaging system as claimed in claim 1, wherein said sealing elements seal end edges of the winding sleeve, said sealing elements comprising an angular profile with two legs, one leg resting against the outer circumference of the winding sleeve and the other leg located between the end edge of the winding sleeve and an inner side of said end walls.

7. The packaging system as claimed in claim 3, wherein said sealing elements comprise a positioning means for positioning the protective sleeve.

8. The packaging system as claimed in claim 1, wherein said winding sleeve, said protective sleeve and said end walls are comprised of a plastic material.

9. The packaging system as claimed claim 1, wherein said winding sleeve, said protective sleeve and said end walls are comprised of a material selected from the group consisting of a composite material, metal and wood.

10. The packaging system as claimed in claim 1, wherein said protective sleeve has a shape selected from a cylindrical or prismatic shape, and wherein said protective sleeve has a rectangular or square cross-section.

11. The packaging system as claimed in claim 1, wherein said tensioning elements comprise straps which are positioned outside said protective sleeve, in grooves present on a side wall of said end walls, and over end edges of said end walls.

12. The packaging system as claimed in claim 1, wherein said tensioning elements comprise;
    a threaded bar;
    a spacer bushing; and
    a threaded nut,
    wherein said threaded bar extends through said winding sleeve and said spacer bushing in a central bore of said plug-on protuberance, and wherein said threaded bar is attached to the threaded nut.

13. The packaging system as claimed in claim 1, wherein said protective sleeve comprises a connection fitting fitted therein.

14. The packaging system as claimed in claim 1, wherein said end walls comprise a connection fitting fitted therein.

15. The packaging system as claimed in claim 1, wherein said sealing elements are comprised of an elastic material.

16. The packaging system as claimed in claim 3, wherein said sealing elements are comprised of an elastic material.

17. The packaging system as claimed in claim 7, wherein said positioning means for positioning said protective sleeve is a bead.

18. The packaging system as claimed in claim 7, wherein said positioning means for positioning said protective sleeve is a groove.

19. A method of packaging a film web wound up in roll form onto a winding sleeve, comprising:

(a) placing at least two end walls having central plug-on protuberances on opposite sides of said winding sleeve wherein said at least two end walls fit tightly into said winding sleeve;

(b) enclosing said film roll on the winding sleeve with a protective sleeve whereby the protective sleeve is of substantially the same length as the winding sleeve and whereby the two sleeves project beyond the outsides of the film roll;

(c) arranging sealing elements between (i) end edges of the protective sleeve and of the winding sleeve and (ii) the opposite inner sides of the end walls; and (d) binding together the two end walls and winding sleeve, with its outer protective sleeve using tensioning elements.

* * * * *